(12) United States Patent
Cacciaguerra

(10) Patent No.: US 7,874,516 B2
(45) Date of Patent: Jan. 25, 2011

(54) STRUCTURAL FRAME FOR AN AIRCRAFT FUSELAGE

(75) Inventor: Bruno Cacciaguerra, Clermont le Fort (FR)

(73) Assignee: Airbus France, Toulouse (FR)

( * ) Notice: Subject to any disclaimer, the term of this patent is extended or adjusted under 35 U.S.C. 154(b) by 540 days.

(21) Appl. No.: 11/718,845

(22) PCT Filed: Nov. 7, 2005

(86) PCT No.: PCT/FR2005/050932

§ 371 (c)(1),
(2), (4) Date: May 8, 2007

(87) PCT Pub. No.: WO2006/051235

PCT Pub. Date: May 18, 2006

(65) Prior Publication Data

US 2008/0093503 A1 Apr. 24, 2008

(30) Foreign Application Priority Data

Nov. 15, 2004 (FR) .................................. 04 52622

(51) Int. Cl.
*B64C 1/00* (2006.01)
(52) U.S. Cl. .................................................... 244/119
(58) Field of Classification Search ................. 244/119, 244/120, 123.4, 118.2, 117 R, 118.1; 52/87, 52/263
See application file for complete search history.

(56) References Cited

U.S. PATENT DOCUMENTS

| 1,803,494 | A |   | 5/1931  | Amiot |
|-----------|---|---|---------|-------|
| 1,963,416 | A |   | 3/1932  | Minshall |
| 2,412,778 | A | * | 12/1946 | Kosek ........................ 244/120 |
| 4,308,703 | A | * | 1/1982  | Knowles ....................... 52/694 |
| 5,171,510 | A |   | 12/1992 | Barquet et al. |
| 5,752,673 | A | * | 5/1998  | Schliwa et al. ........... 244/118.6 |
| 6,003,812 | A | * | 12/1999 | Micale et al. ........... 244/117 R |

FOREIGN PATENT DOCUMENTS

| DE | 40 17 978 A1 |   | 12/1991 |
|----|--------------|---|---------|
| DE | 101 45 276 A1 |  | 7/2003 |
| WO | WO0298651 | * | 5/2002 |

\* cited by examiner

*Primary Examiner*—Timothy D Collins
*Assistant Examiner*—Michael Kreiner
(74) *Attorney, Agent, or Firm*—Perman & Green LLP

(57) ABSTRACT

A structural frame for a fuselage including a lower arched structure (1), a cross-piece (2), supporting a floor element (3) and a connecting lattice (4) between the lower arch (1) and the cross-piece (2), the connecting lattice (4) more particularly may comprise bars (4*a*, 4*b*) the ends of which are spliced to the cross-piece (2) and the lower arch (1).

9 Claims, 3 Drawing Sheets

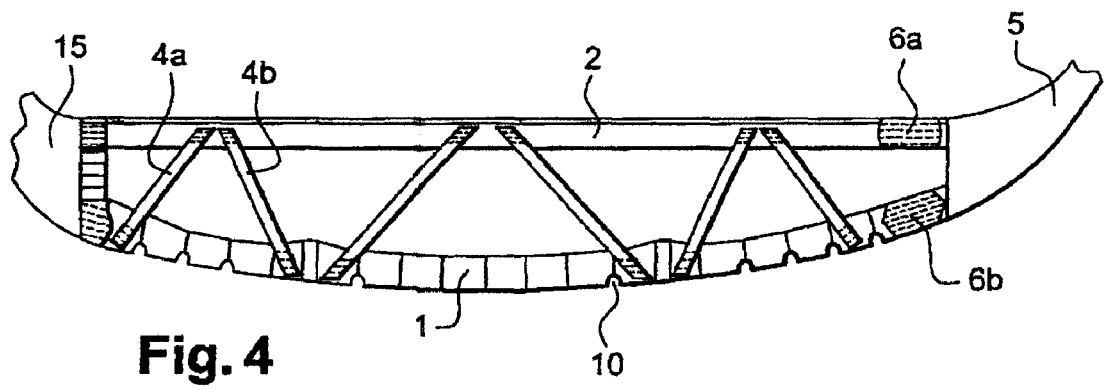
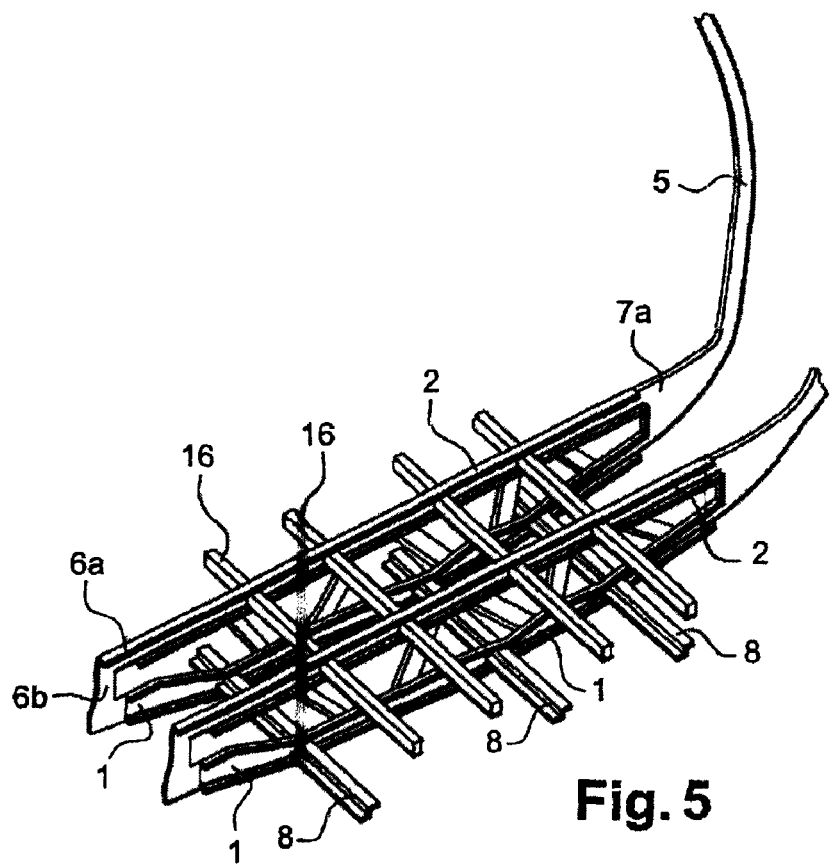

STRUCTURAL FRAME FOR AN AIRCRAFT FUSELAGE

This application is the National Stage of International Application No. PCT/FR2005/050932, International Filing Date, 7 Nov. 2005, which designated the United States of America, and which international application was published under PCT Article 21(2) as WO Publication No. WO 2006/051235 and which claims priority from German Application No. 0452622, filed 15 Nov. 2004.

BACKGROUND

1. Field

The present invention relates to a structural frame for an aircraft fuselage producing a floor support suitable for receiving heavy loads whilst remaining low in weight.

2. Description of Related Developments

The structures for aircraft fuselages comprise frames placed transversally at the axis of the fuselage, the lower portion of the frames being jointly called arch.

To combat the tendency of the floor to deform in particular by pressurisation inside the cabin when the aircraft is in flight, the connection of cross-piece elements supporting a floor such as the floor of the hold of the aircraft on the frames is desirable.

SUMMARY

The present invention is particularly suitable for producing structural frames for aircraft forming means supporting a floor of an aircraft, by constituting a structure provided with a metal arch and a composite cross-piece, the cross-piece forming the support for the floor.

To do so, the present invention mainly relates to a structural frame for a fuselage which comprises a lower arched structure, a cross-piece supporting a floor element and a connecting lattice between the lower arched structure and the cross-piece.

Said configuration where the cross-piece is placed away from the lower arched structure and connected to said latter via a metal or composite lattice enables a frame with a very strong inertia and considerable height to be produced and said for the lowest possible weight and cost, the lower structure comprising the cross-piece, the lattice and the lower arch contributing to the overall stiffness of the frame.

Furthermore and according to one advantageous embodiment, the use of a connecting lattice comprising composite material bars the ends of which are spliced to the cross-piece and the lower arched structure enables the thermal exchanges between the shell of the fuselage and the cross-piece of the frame whereon are installed components (structures or systems) to be minimised.

DRAWINGS

Figure 1:
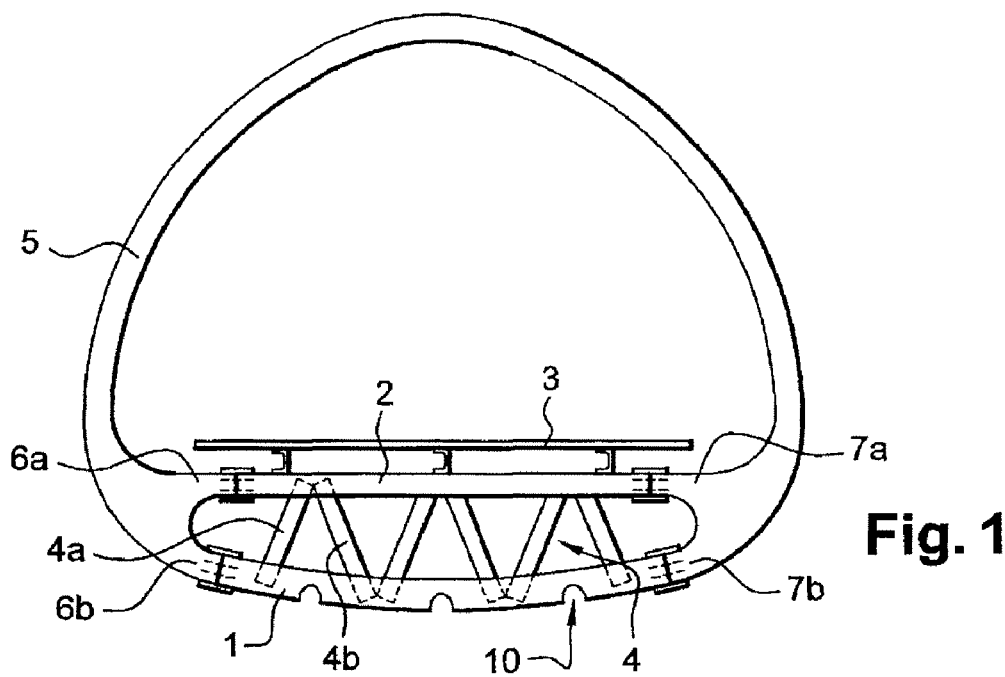
Figure 2A:
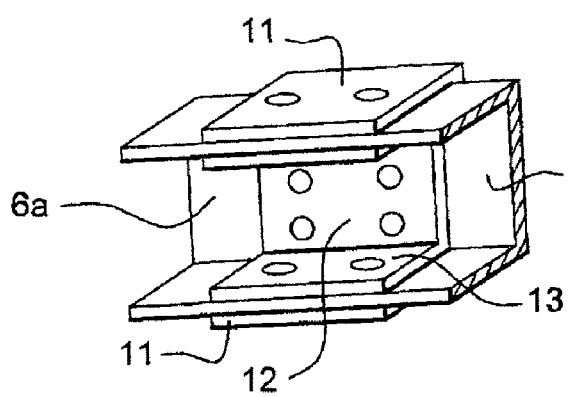
Figure 2B:
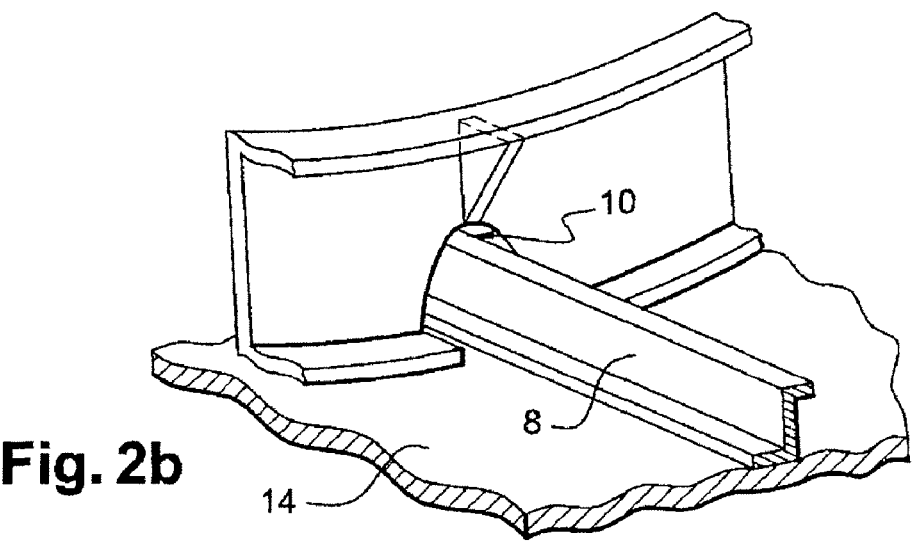
Figure 3:
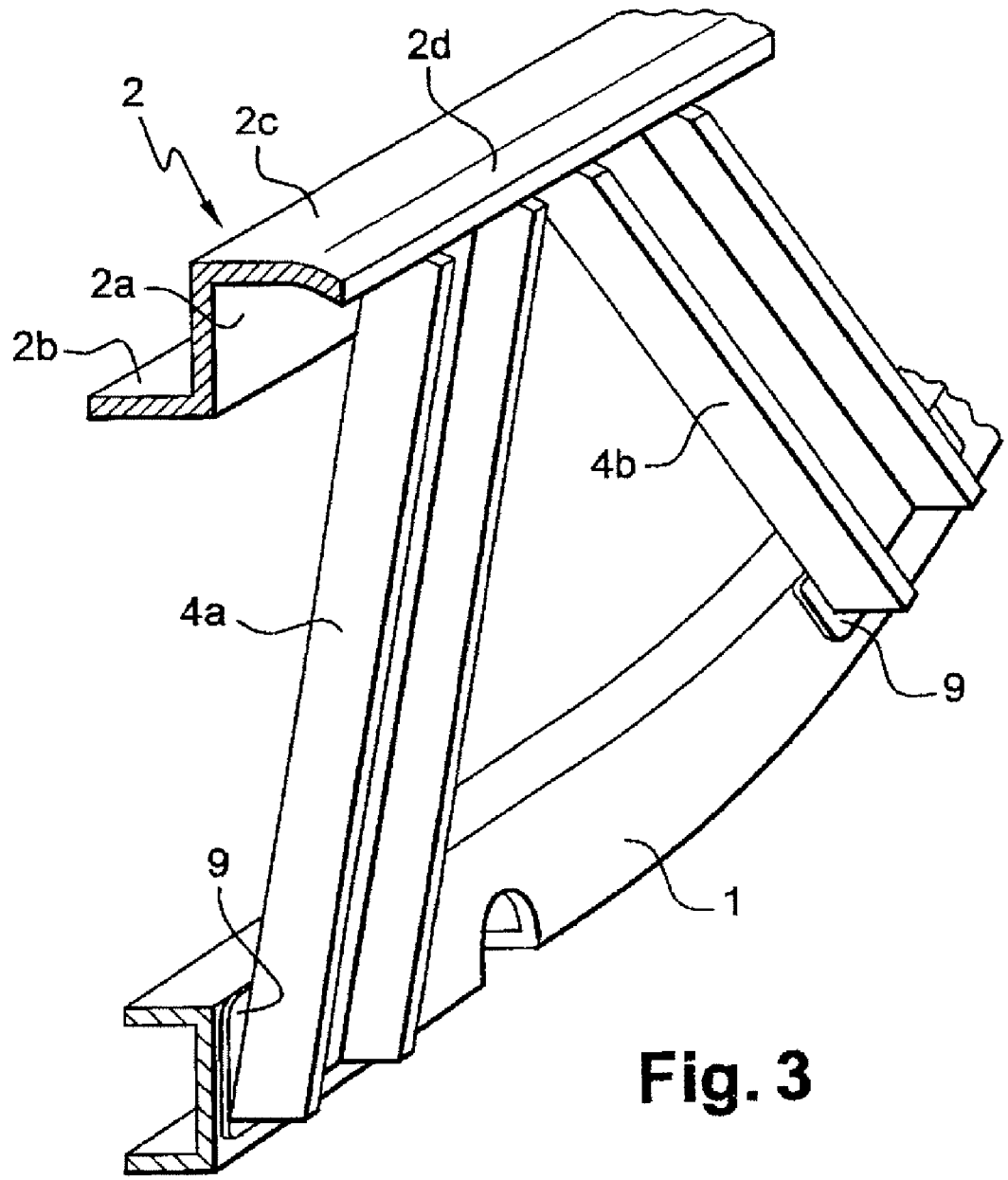

Other characteristics and advantages of the invention will be better understood on reading the description which will follow of a non-limitative example of an embodiment of the invention in light of the figures which show:

FIG. 1; a front view of a structural frame of a fuselage according to the invention;

FIGS. 2a, 2b: perspective details of the frame from FIG. 1;

FIG. 3: a perspective view of the details of the lattice of the frame from FIG. 1;

FIG. 4: an enlarged front view of a lower portion of a frame element according to the invention FIG. 5: a perspective view of two frames of a fuselage structure according to the invention.

DESCRIPTION

FIG. 1 is an overall view of a structural frame of a fuselage comprising a lower arch 1, a cross-piece 2 supporting a floor element 3 and a connecting lattice 4 between the lower arch 1 and the cross-piece 2.

Said configuration where the cross-piece 2 is separated from the lower arch 1 and connected to said latter via a lattice 4 enables a frame with a very strong inertia and considerable height to be produced.

The lower structure including the cross-piece 2, the lattice 4, comprising bars 4a, 4b the ends of which are spliced to the lower arch 1 and the cross-piece 2, and, the lower arch 1 perfectly supports the floor and stiffens the entire frame, which is for example particularly suitable for a cargo aircraft configuration, the space between the cross-piece 2 and the lower arch 1 and the use of composite materials for the cross-piece 2 and the lattice 4 enabling the thermal exchanges between the shell of the fuselage and the cross-piece of the frame whereon are installed the components to be minimised.

For connecting the arch and the cross-piece, the upper frame element 5 is provided with arms 6a, 6b, 7a, 7b connecting with the cross-piece 2 and with the lower arch 1. The upper frame element 5 and the lower arch 1 form part of a frame of the structure of the fuselage.

According to the example in FIG. 1, the connection arms 6a, 6b, 7a, 7b form a fork at each end of the upper frame 5, the lower arch 1 and the cross-piece 2 being attached to the arms 6a, 6b, 7a, 7b of each fork via splicing.

The attachment of the arms to the cross-piece and to the lower arch is produced via splicing, an example being shown in FIG. 2a for the attachment of the arm 6a to one end of the cross-piece 2.

According to said example, the lower arch 1 and the cross-piece 2 are attached to the arms 6a, 6b, 7a, 7b of each fork via end-to-end splicing with the aid of splice plates 11, 12 and bolts 13.

In one preferred embodiment, the bars 4 are, as shown in FIG. 3 composite material beams with a U-shaped section, the cross-piece 2 itself also in composite materials, being produced according to said example in the form of a vertical web 2a equipped with two longitudinal horizontal fabrics 2b, 2c of opposite directions placed on the lateral edges of the web 2a, one of the fabrics may be provided on its free edge with a flattened lip 2d opposing any twisting of the fabric 2c.

The lower arch 1 may, like the cross-piece 2, be a composite material arch but may also be a metal arch such as a machined aluminium arch.

In the case where the lower arch 1 is a metal arch, the latter is painted before attachment of the bars and the upper frame and a glass fabric crease 9 is placed between the ends of the bars 4a, 4b and the lower arch 1 to prevent any risk of corrosion at the interface between the bars and the lower arch.

According to the example in FIG. 2b, the lower arch 1 is a ribbed beam provided with passage holes 10 for longitudinal stringers 8 supporting panels 14 of the fuselage.

FIG. 5 is a view of the embodiment of the structure of a segment of fuselage with the stringers 8 and longerons 16 connecting the frames.

The frames are placed spaced apart one behind the other along the structure of the fuselage and are of variable dimensions according to their longitudinal position and the shape of the fuselage.

The structural frame of the fuselage according to the invention is suitable for being produced with metal elements or by a mixed metal-composite structure, the composite lattice splicing on a metal or composite arch.

The invention according to which all of the elements, arch, cross-piece frame and connecting lattice contribute to the stiffness of the assembly is not limited to the example shown and in particular FIG. 4 shows an alternative embodiment for which the upper frame is of dissymmetric type and comprises at one of its ends a fork provided with arms 6a, 6b and at its other end a single attachment plate 15, all of the arched structures, cross-piece and bars may be in composite material or at least one of the elements may be metal, the others being in composite material.

The invention claimed is:

1. A structural frame of a fuselage the frame comprising a lower arch, a cross-piece, supporting a floor element and a connecting lattice between the lower arch and the cross-piece, the frame further comprising an upper frame element provided with arms connecting with the cross-piece and with the lower arch.

2. A structural frame of a fuselage according to claim 1 wherein the connecting lattice comprises bars, the ends of which are spliced to the cross-piece and the lower arch.

3. A structural frame of a fuselage according to claim 2 wherein the bars are composite material beams with a U-shaped section.

4. A structural frame of a fuselage according to claim 1 wherein the connecting arms form a fork at each end of the upper frame, the lower arch and the cross-piece being attached to the arms of each fork via splicing.

5. A structural frame of a fuselage according to claim 4 wherein the lower arch and the cross-piece are attached to the arms of each fork via end-to-end splicing.

6. A structural frame of a fuselage according to claim 1 wherein the lower arch is a ribbed beam provided with passage holes for longitudinal stringers.

7. A structural frame of a fuselage according to claim 1 wherein the lower arch is a machined metal arch, a glass fabric crease being placed between the ends of the bars and the lower arch.

8. A structural frame of a fuselage according to claim 1, wherein the lower arch is a composite material arch.

9. A structural frame of a fuselage according to claim 1 comprising metal elements and elements made of composite material.

\* \* \* \* \*

UNITED STATES PATENT AND TRADEMARK OFFICE
CERTIFICATE OF CORRECTION

PATENT NO.        : 7,874,516 B2  
APPLICATION NO.   : 11/718845  
DATED             : January 25, 2011  
INVENTOR(S)       : Bruno Cacciaguerra Page 1 of 1

It is certified that error appears in the above-identified patent and that said Letters Patent is hereby corrected as shown below:

Column 3, line 16, in Claim 1, delete "fuselage" and insert -- fuselage, --, therefor.

Signed and Sealed this
Eighth Day of March, 2011

David J. Kappos
*Director of the United States Patent and Trademark Office*